United States Patent
Fang (10) Patent No.: US 9,912,714 B2
(45) Date of Patent: Mar. 6, 2018

(54) SENDING 3D IMAGE WITH FIRST VIDEO IMAGE AND MACROBLOCKS IN THE SECOND VIDEO IMAGE

(75) Inventor: Wen Fang, Shenzhen (CN)

(73) Assignee: ZTE CORPORATION, Shenzhen, Guangdong (CN)

( * ) Notice: Subject to any disclaimer, the term of this patent is extended or adjusted under 35 U.S.C. 154(b) by 426 days.

(21) Appl. No.: 14/380,990

(22) PCT Filed: May 17, 2012

(86) PCT No.: PCT/CN2012/075676
§ 371 (c)(1),
(2), (4) Date: Aug. 26, 2014

(87) PCT Pub. No.: WO2013/127126
PCT Pub. Date: Sep. 6, 2013

(65) Prior Publication Data
US 2015/0003532 A1    Jan. 1, 2015

(30) Foreign Application Priority Data

Feb. 27, 2012  (CN) .......................... 2012 1 0045946

(51) Int. Cl.
*H04N 19/51*    (2014.01)
*H04L 29/06*    (2006.01)
(Continued)

(52) U.S. Cl.
CPC ....... *H04L 65/601* (2013.01); *H04N 13/0048* (2013.01); *H04N 19/132* (2014.11);
(Continued)

(58) Field of Classification Search
CPC .. H04L 65/601; H04N 19/597; H04N 19/139; H04N 19/132; H04N 19/503; H04N 13/0048
See application file for complete search history.

(56) References Cited

U.S. PATENT DOCUMENTS 6,968,012 B1 *  11/2005  Meggers ............. H04N 19/119
                                             375/240.18
8,295,358 B1    10/2012  Meggers
(Continued)

FOREIGN PATENT DOCUMENTS

CN        1545333 A      11/2004
CN      102045571 A       5/2011
(Continued)

OTHER PUBLICATIONS

International Search Report in international application No. PCT/CN2012/075676, dated Dec. 6, 2012.
(Continued)

*Primary Examiner* — Jay Patel
*Assistant Examiner* — Joseph Suh
(74) *Attorney, Agent, or Firm* — Oppedahl Patent Law Firm LLC (57) ABSTRACT

A video image sending method, device and system is provided, which is adapted to send a 3D video image between video players. An acquired first video image is compared with an acquired second video image to find out macro blocks in the second video image which are different from those in the first video image; and the first video image and the macro blocks are sent as an I-frame video image to a network side.

14 Claims, 6 Drawing Sheets

(51) Int. Cl.
*H04N 13/00* (2018.01)
*H04N 19/597* (2014.01)
*H04N 19/503* (2014.01)
*H04N 19/139* (2014.01)
*H04N 19/176* (2014.01)
*H04N 19/132* (2014.01)

(52) U.S. Cl.
CPC ......... *H04N 19/139* (2014.11); *H04N 19/176* (2014.11); *H04N 19/503* (2014.11); *H04N 19/597* (2014.11)

(56) References Cited

U.S. PATENT DOCUMENTS

| | | | | |
|---|---|---|---|---|
| 2002/0009137 | A1* | 1/2002 | Nelson | H04N 7/01 375/240.1 |
| 2002/0041262 | A1* | 4/2002 | Mukai | G06F 1/1613 345/30 |
| 2005/0025369 | A1 | 2/2005 | Shah | |
| 2005/0084012 | A1 | 4/2005 | Hsu | |
| 2005/0190976 | A1* | 9/2005 | Todoroki | H04N 19/433 382/236 |
| 2006/0013490 | A1* | 1/2006 | Sun | H04N 19/597 382/232 |
| 2007/0171982 | A1 | 7/2007 | Meggers | |
| 2010/0165083 | A1* | 7/2010 | Sasaki | G11B 20/10527 348/51 |
| 2010/0303151 | A1* | 12/2010 | Jeon | H04N 19/105 375/240.12 |
| 2011/0280300 | A1 | 11/2011 | Tourapis | |
| 2011/0286529 | A1 | 11/2011 | Meggers | |
| 2012/0002864 | A1* | 1/2012 | Kouno | H04N 19/597 382/154 |
| 2012/0033041 | A1* | 2/2012 | Nagaraj | H04N 13/0029 348/43 |
| 2012/0086773 | A1* | 4/2012 | Park | H04N 13/0055 348/43 |
| 2012/0314077 | A1* | 12/2012 | Clavenna, II | H04N 21/2187 348/159 |
| 2013/0021352 | A1* | 1/2013 | Wyatt | G09G 5/395 345/520 |
| 2013/0310177 | A1* | 11/2013 | Okada | G07F 17/3234 463/31 |
| 2014/0125780 | A1* | 5/2014 | Suh | H04N 13/0048 348/51 |

FOREIGN PATENT DOCUMENTS

| | | |
|---|---|---|
| CN | 102325254 A | 1/2012 |
| EP | 1503596 A2 | 2/2005 |
| JP | 01202093 A | 2/1989 |
| JP | H01202093 A | 8/1989 |
| JP | 02131697 A | 5/1990 |
| JP | 04061494 A | 2/1992 |
| JP | 07046630 A | 2/1995 |
| JP | 08140090 A | 5/1996 |
| JP | H10191394 A | 7/1998 |
| JP | 2008214336 A | 9/2008 |
| JP | 2009543508 A | 12/2009 |
| JP | 2010525724 A | 7/2010 |
| JP | 2010191394 A | 9/2010 |
| JP | 2011205819 A | 10/2011 |
| WO | 2010088420 A1 | 8/2010 |

OTHER PUBLICATIONS

English Translation of the Written Opinion of the International Search Authority in international application No. PCT/CN2012/075676, dated Dec. 6, 2012.
Supplementary European Search Report in European application No. 12869783.6, dated Feb. 10, 2015.
Overview of the Stereo and Multiview Video Coding Extensions of the H.264/MPEG-4 AVC Standard, Apr. 1, 2011.
Basics of stereoscopic video, new compression results with MPEG-2 and a proposal for MPEG-4, Jul. 1, 1997.
Efficient Prediction Structures for Multiview Video Coding, Nov. 1, 2007.
Extended texture prediction for H.264/AVC intra coding, Jan. 14, 2007.
Video coding for low bit rate communication; H.263 (03/96), Mar. 20, 1996.
A DCT-domain H.263 based video combiner for multipoint continuous presence video conferencing, Jun. 7, 1999.
MVC motion skip mod, Apr. 19, 2007.

* cited by examiner

| PSC | TR | PTYPE | PQUANT | CPM | PSBI | TRB | DBQUANT | PEI | PSPARE | PEI | Group of Blocks | ESTU | EOS | PSTUF |

Fig. 6

| GSTUF | GBSC | GN | GSBI | GFID | GQUANT | Macroblock Date |

Fig. 7

| COD | MCBPC | MODB | CBPB | CBPY | DQUANT | MVD | MVD2 | MVD3 | MVD4 | MVDB | Block data |

SENDING 3D IMAGE WITH FIRST VIDEO IMAGE AND MACROBLOCKS IN THE SECOND VIDEO IMAGE

TECHNICAL FIELD

The disclosure relates to a video image processing technology, in particular to a video image sending method, device and system.

BACKGROUND

With the improvement of the network technology and the video coding technology, a 3-dimension (3D) display technology with the sense of reality and stereoscopy has been applied into various communication terminals step by step, such as televisions, game machines, laptops, video players and cell phones, etc. A 3D video display terminal can be used for sending a 3D video, which improves the user experience of 3D video services.

A 3D video display terminal has two image acquisition units (cameras) acquiring two images taken from different angles, which are sent to a receiver terminal after being encoded. The receiver decodes the received images and a user enjoys the video with a stereoscopic effect. However, it brings about a large data amount when a 3D video presents in a certain format. The large data amount puts forward a challenge to each step of acquiring a video, coding, sending or displaying a 3D video. In the network technology, especially in the wireless network technology, where there are not only the lack of bandwidth resources but also the limited power of wireless terminals in a wireless sending environment, the large amount of data is sent in a narrow bandwidth, which may lead to packet loss and image distortion, such that the 3D video could not be sent effectively and reliably.

At present, a 2D video is sent with the H.263 video communication protocol in the H.324 protocol stack. Since the H.263 video communication protocol is a communication standard with which a video is sent at a low bit rate (tens of Kbps), sending a video with such communication protocol can maximize the reduction of the data amount of the video to be sent, which saves the bandwidth. Because of the large data amount of a 3D video, it is impossible to send a 3D video effectively and reliably with a bandwidth required by the existing H.263.

SUMMARY

The embodiments of the disclosure provide a video image sending method, device and system used for sending a 3D video effectively and reliably with a bandwidth required by the existing H.263.

The embodiments of the disclosure provide a video image sending method adapted to send a 3D video image between video players, comprising:

comparing an acquired first video image with an acquired second video image in order to find out macro blocks in the second video image which are different from those in the first video image;

sending the first video image and the macro blocks, as an I-frame video image, to a network side.

The embodiments of the disclosure provide a video image receiving method, comprising:

receiving, from a terminal, a first video image of an I-frame video image and macro blocks in a second video image which are different from those in the first video image;

generating the second video image according to the first video image and the macro blocks.

The embodiments of the disclosure provide a video image sending device, comprising:

a video image comparing unit used for comparing an acquired first video image with an acquired second video image in order to find out macro blocks in the second video image which are different from those in the first video image;

a video image sending unit for sending the first video image and the macro blocks, as an I-frame video image, to the network side.

The embodiments of the disclosure provide a video image receiving device, comprising:

a video image receiving unit used for receiving, from a network side, a first video image of an I-frame video images and macro blocks in the second video image of the I-frame video image which are different from those in the first video image;

a video image generating unit, used for generating the second video image according to the first video image and the macro blocks.

The embodiments of the disclosure provide a video image sending system, comprising: a video image sender and a video image receiver;

the video image sender is used for comparing an acquired first video image with an acquired second video image in order to find out macro blocks in the second video image which are different from those in the first video image; and for sending the first video image and the macro blocks, as an I-frame video image, to a network side.

the video image receiver is used for receiving, from the video image sender, a first video image of an I-frame video image and macro blocks in the second video image of the I-frame video image which are different from those in the first video image; generating the second video image according to the first video image and the macro blocks.

The embodiment of the disclosure consist in comparing an acquired first video image with an acquired second video image in order to find out macro blocks in the second video image which are different from those in the first video image; sending the first video image and the macro blocks, as an I-frame video image, to a network side; receiving, by the network side, a first video image of an I-frame video image and macro blocks in the second video image of the I-frame video image which are different from those in the first video image; generating the second video image according to the first video image and the macro blocks, which implements sending a 3D video reliably and effectively with the bandwidth required by the existing H.263.

DETAILED DESCRIPTION

The embodiments of the disclosure provide a video image sending method, device and system, used for sending a 3D video effectively and reliably with a bandwidth required by the existing H.263.

A 3D technology, also called stereoscopic image technology, has the basic principle: the scenes viewed by the left and right eyes of a person have a certain difference since the positions thereof are different. One can sense the difference between far and near objects and can have a visual stereoscopic impression on a viewed video, since the brain processes the different images received from the left and right eyes.

Figure 1:
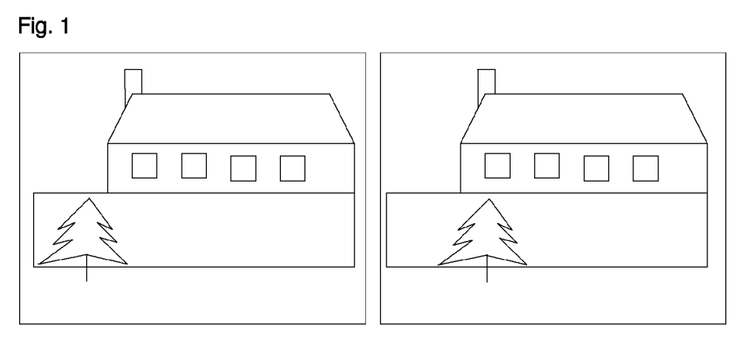
FIG. 1 shows left and right views including a distant shot and a close shot provided by the embodiments of the disclosure.

A 3D video display terminal has two image acquisition units, which can be cameras, equivalent to the left and right eyes of a person. A left eye video image (or left view) and a right eye video image (or right view), which are acquired by the image acquisition units at a single time, are sent to a video decoder of the video display terminal, and are decoded by a video receiver to display the 3D video. It can be seen from the imaging principle that, the difference between the imaging positions of the left and right cameras becomes larger with the approach of the object to the lens. Generally, the left eye video image and the right eye video image have considerable differences only for a image close to the lens (i.e., close shot), otherwise the difference between the imaging positions in the left and right eyes of the image far from the lens (i.e., distant shot) is tiny and can be omitted. For example, with reference to FIG. 1 in which there are two images after the image formation by the left and right eyes, each comprising a close shot (e.g., a tree) and a distant shot (e.g., a house), which present different position relations between the tree and the house for the different observation angles of the left and right eyes, which is the cause of the generation of stereoscopic impression.

Thus, the existing 3D technology intends to have the left and right eyes of a person to view simultaneously the left and right video images which are different in order to make the one have a sense of the stereoscopic effect.

At present, a video is sent with the H.263 communication protocol which processes the video by means of dispersion sending, motion prediction and estimation, etc., which enables the bandwidth to be saved at the greatest extent. Specifically, each frame image can finally generate one or two complete images in the image receiver by sending images in the manner of alternating I-frames and P-frames. An I-frame is generally called an INTRA which is used for sending a complete image, for example, a complete image of a 2D video or two images (left eye and right eye images) of a 3D video, the I-frame being used as a reference frame for a P-frame. A P-frame is generally called an INTER which is used for sending an offset relative to the previous frame; the receiving terminal receives the offset sent in the P-frame and acquires a complete image of the current frame according to the complete image generated from the previous frame. One I-frame is sent at an interval of several P-frames in order to avoid failure of restoring the image without a reference frame in case of an error.

The P-frame above-mentioned takes use of predictive encoding, in which an image sender and an image receiver predict the moving positions of the previous moving objects in the next image for the moving features of the objects in the previous video, the receiver displaying the next image directly according to its prediction without sending any data by the sender if the predicting outcome is right. If not, that is, there is a difference, the image sender only needs to send the motion vectors of the motions of a certain part in the image to the receiver which is able to adjust the image according to its predictive outcome and the motion vectors sent from the sender in order to acquire the next image, which reduce the data amount of the network sending at the greatest extent.

Since the number of images sent by each frame in 3D video sending changes from 1 to 2 in comparison with 2D video sending, the macro block data of the images is twice as much as before, the I-frame and the P-frame being required to send the data twice as much as the 2D video, which greatly increases the bandwidth for sending data.

It is required that there is a compatibility with the video sending of a 3D format with minimal modifications in the existing H.263 communication protocol system, so as to send the 3D video data effectively and reliably. The embodiments of the disclosure add a comparing unit for left and right views before or in an existing image encoder and a generating unit for left and right views after an existing decoder or in an existing video encoder.

The comparing unit for left and right views and the generating unit for left and right views are used for sending one complete view and a view different from the complete view in the other view while sending I-frame images, without the need of sending an image identical to the complete image and thus the bandwidth is saved.

The embodiments of the disclosure only need to send a set of motion vectors to the video receiver during the sending of a P-frame image. That is because the motion displacement in the left and right views are identical, that is, the motion vectors are identical, when the scene in a video moves, the receiver being able to apply a single sent motion vector to the left and right views simultaneously. In comparison with the art, the data amount does not increase when the P-frame is sent. Thus, it is possible that the disclosure send a 3D video effectively and reliably with a bandwidth required by the existing H.263 communication protocol.

The technical solution provided by the embodiments of the disclosure is described hereafter with the drawings.

Figure 2:
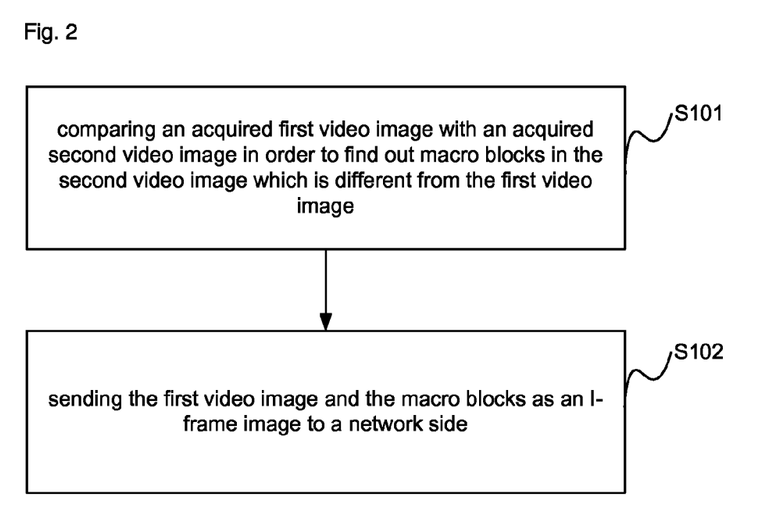
FIG. 2 is a schematic view of the overall flow chart of a video image sending method provided by the embodiments of the disclosure.

With reference to FIG. 2, a video image sending method provided by the embodiments of the disclosure, which is used for sending a 3D video, comprises following steps:

S101, comparing an acquired first video image with an acquired second video image in order to find out macro blocks in the second video image which are different from the first video image;

S102, sending the first video image and the macro blocks, as an I-frame image, to a network side.

Preferably, the method also comprises: after finding out the macro blocks and before sending the macro blocks, encoding the first video image and the macro blocks, and sending the encoded video image to the network side.

Preferably, a motion displacement of a current frame relative to the first or second video image of its previous frame is sent, as a P-frame video image, to the network side.

The network side described in the embodiments of the disclosure is a device for receiving the video.

Figure 3:
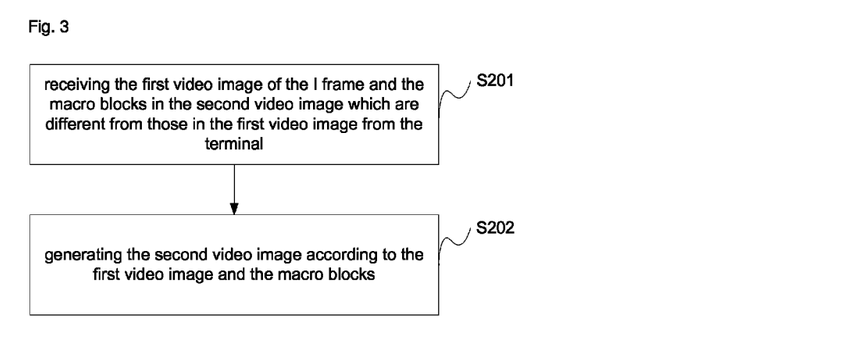
FIG. 3 is a schematic view of the overall flow chart of a video image receiving method provided by the embodiments of the disclosure.

With reference to FIG. 3, the embodiments of the disclosure provide a video image receiving method, comprising following steps:

S201, receiving, from a terminal (video image sender), a first video image of an I-frame video image and macro blocks in the second video image of the I-frame video image which are different from those in the first video image;

S202, generating the second video image according to the first video image and the macro blocks.

Preferably, the generating the second video image according to the first video image and the macro blocks comprises: generating the second video image by splicing the macro blocks in the first video image which are identical to those in the second video image with the macro blocks in the second video image which are different from those in the first video image.

Preferably, the method also comprises: before generating the second video image after receiving the first video image and the macro blocks in the second video image which are different from those in the first video image, decoding the first video image and the macro blocks in the second video image which are different from those in the first video image.

Preferably, the video image receiving method also comprises: receiving, from a terminal, a motion displacement of a current frame relative to the first or second video image of its previous frame, as a P-frame video image; and performing motion prediction and compensation for the first and the second video images of the previous frame according to a set of motion vectors, to generate the first and second video images of the current frame.

A process for sending video images and a process for receiving video images provided by the embodiments of the disclosure are described hereafter with reference to the drawings.

For simplicity, the sender to be described below is a terminal equipment for sending video images, the receiver is an equipment for receiving video images at the network side, the sender equipment and the receiver equipment may be any video player supporting 3D videos. Moreover, the left view is the left eye video image, and the right view is the right eye video image.

Figure 4:
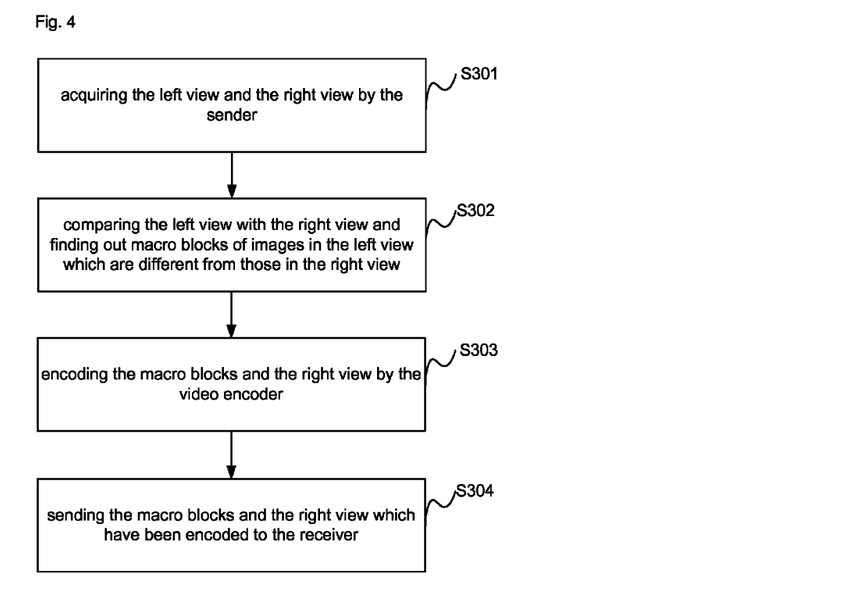
FIG. 4 is a schematic view of the specific flow chart of a video image sending method provided by the embodiments of the disclosure.

When the video player is used as a sender for sending video images, the process of the method for sending video by the video player provided by the embodiments of the disclosure is shown in FIG. 4, comprising steps:

S301, acquiring the left view and the right view by a sender.

Specifically, two video acquisition units, such as cameras, on the video player acquire two video images (image A and B) at a certain time with different angles (generally left and right cameras), each image comprising a distant shot and a close shot.

The distant shot is generally the background or the scene far from the lens in the video image. The positions of the distant shots in the left and right have hardly any difference in the overall view. Wherein, it is considered to have no difference if the difference between the imaging positions of the left and right cameras is no more than a certain amount of pixels, for example, no more than 2 or 1 pixel. Similarly, the close shot is the scene close to the lens in the video image. The difference of the imaging positions of the close shots is relatively great. Thus, it is not necessary to send the distant shot in the I-frame repeatedly during the sending of video images in the embodiments of the disclosure.

S302, comparing the left view with the right view and finding out macro blocks of images in the left view which are different from those in the right view.

The macro blocks are those in which the imaging positions in the left and right views are different. Specifically, in the video player, a video comparing unit place in a video encoder or independent of the video encoder matches the macro blocks in the left view with those in the right view, in order to find out the macro blocks that are different in the left and right views. For example, macro blocks in the left view which are different from those in the right view are found out.

S303, encoding the macro blocks and the right view by the video encoder.

Figure 5:
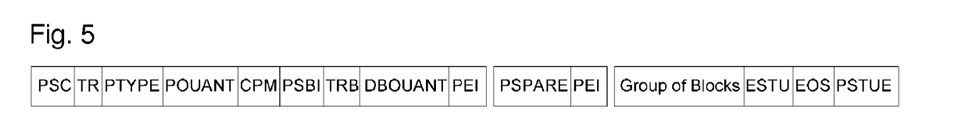
FIG. 5 is the schematic view of the encoding structure on the H.263 video layer provided by the embodiments of the disclosure.

For the encoding structure on the H.263 image layer shown in FIG. 5, when the ninth bit in PTYPE is "1" which is used for representing image type in the encoding structure on the image layer, it means that the image of the frame is of INTRA encoding, that is, I-frame encoding. When the ninth bit in PTYPE is "0", it means that the image of the frame is INTER encoding, that is, P-frame encoding.

Figure 6:
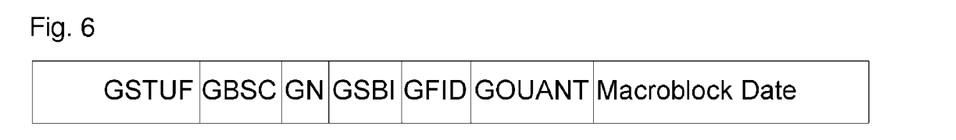
FIG. 6 is the schematic view of the encoding structure on the H.263 group of block (GOB) layer provided by the embodiments of the disclosure.

I-Frame Encoding:

The I-frame described in the embodiments of the disclosure comprises two views at the same time, one being a complete view (e.g., the right view), the other being an incomplete view (e.g., macro blocks that are different in the left and right views, that is, macro blocks). Specifically, the GOB of I-frames comprise image information of the left and the right views, in which the right view is a complete image and the left view in its actual data comprises only the part which is different from the right view on the pixel level. According to the coding structure of H263 GOB layer shown in the FIG. 6, in the existing H.263, one macro block data in the I-frame comprises all the macro blocks in one image. In the embodiments of the disclosure, one macro block data comprises only macro blocks of the distant shot and the close shot in one view and the macro blocks in the other view which are different from the macro blocks of the close shot, omitting the macro blocks of the distant shot in one of the views and part of the macro blocks of the close shot in the view (this part of the macro blocks of the close shot is the macro blocks which are different from those of the close shot in the other view). In comparison to encoding a 3D view of I-frames which comprises two complete views simultaneously, the embodiments of the invention greatly reduce the data amount for encoding image by an encoder and reduce the amount of the 3D video image data to be sent. In comparison to encoding the 2D view of an I-frame of an image, only macro blocks with little data amount are increased, which hardly increases any bandwidth for the network sending.

In the image encoding technology, the encoding of an image comprises I-frame encoding, P-frame encoding and PB-frame encoding, etc. The process for the P-frame encoding according to the disclosure is simply described below.

P-Frame Encoding:

A P-frame is the one carrying through the motion prediction and dispersion sending, in combination with the motion prediction and compensation, only the dispersion of each image which is different from the prediction is sent.

Figure 7:
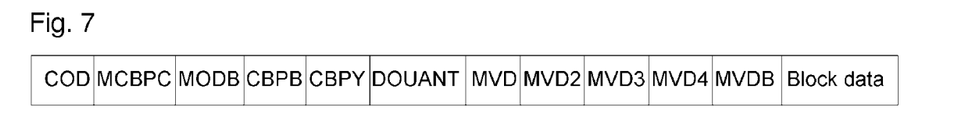
FIG. 7 is the schematic view of the encoding structure on the macro block layer provided by the embodiments of the disclosure.

With reference to the schematic view of the data structure on the macro block layer shown in FIG. 7, if a certain macro block prediction is completely identical to the actuality, the COD on the macro block layer is zero and sending data no longer continues. Otherwise, the COD is one, and motion vectors are sent, or motion vectors and block data are sent.

During the encoding of the P-frame image in the embodiments of the disclosure, no processing is implemented when the macro blocks and the right view are received.

The embodiments of the disclosure, during sending of the P-frame, comprise two situations as following:

1. When there is no motion occurred in the image in a video image, both of the left view and the right view do not change, that is, the motion prediction is correct, the dispersion of the image relative to the previous frame is zero, then the sender does not have to send any data and the receiver playbacks the next image directly according to its prediction.

2. When there is a motion occurred in the image in the video image, the motion vectors differ from the motion prediction, in the meantime, the image itself does not occur any mutation, then in the P-frame, merely a set of motion vectors is sent, which is the motion vectors of the left view or the right view, sending the motion vectors of the left view or the right view is all the same because the motion displacements of the left and the right views are consistent and the motion vectors are identical once the scenes in the video moves, thus only a set of motion vectors is sent.

When the receiver receives the motion vectors, the motion vectors are applied to the left and the right views which have been decoded.

S304, sending the macro blocks and the right view which have been encoded to a receiver. The macro blocks and the right view belong to an I-frame image.

Figure 8:
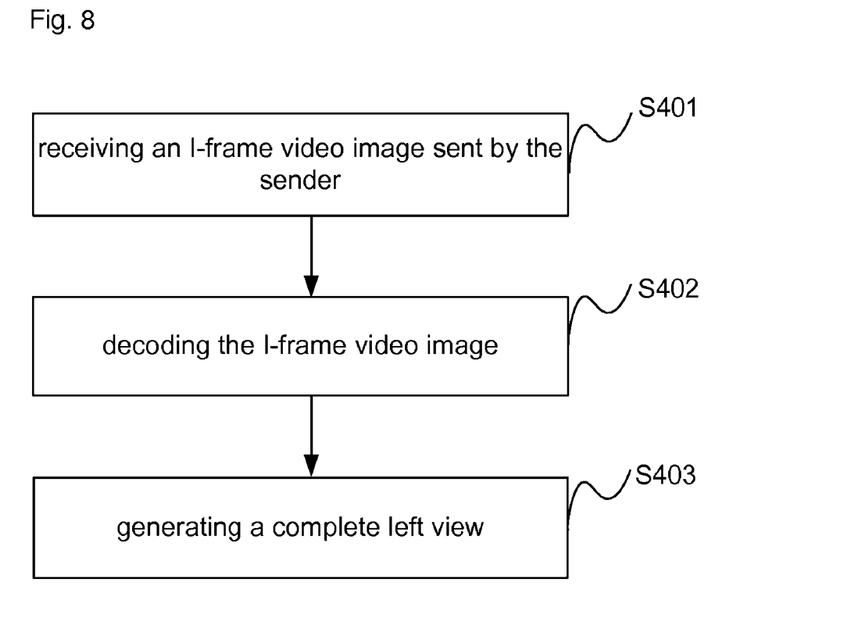
FIG. 8 is a schematic view of the specific flow chart of a video image receiving method provided by the embodiments of the disclosure.

When a video player is taken as the receiver for receiving video images, the process of the method for sending video by the video player provided by the embodiments of the disclosure is shown in FIG. 8, comprising steps:

S401, receiving, from a sender, an I-frame video image, specifically receiving macro blocks and a right view.

S402, decoding the I-frame video image.

Specifically, the complete view (e.g., the right view) and the incomplete view (e.g., the view comprising nothing but dispersion macro blocks) that have been received are decoded by means of normal decoding.

S403, generating a complete left view.

Specifically, a video image generating unit generates a complete left view by splicing the macro blocks in the right view which are identical to those in the left view with the macro blocks in the left view which are different from those in the right view. Otherwise, the macro blocks in the right view which are identical to those in the left view are added into the incomplete left view.

It should be noted that the disclosure decoding a P-frame is: when a set of motion vectors is received from the sender, the motion vectors are applied to the left and right views of the previous frame in order to generate complete left and right views of the current frame.

Figure 9:
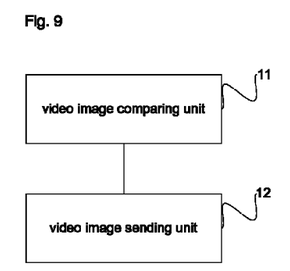
FIG. 9 is a schematic view of the structure of a video image sending device provided by the embodiments of the disclosure.

With reference to FIG. 9, a video sending device provided by the embodiments of the disclosure comprises a video image comparing unit 11 and a video image comparing unit 11.

The video image comparing unit 11 is configured to compare an acquired first video image with an acquired second video image in order to find out macro blocks in the second video image which are different from those in the first video image;

The video image comparing unit 11 is configured to send the first video image and the macro blocks, as an I-frame video, to the network side.

Preferably, the video image sending unit 12 is also used for: sending a motion displacement of a current frame relative to the first or second video image of its previous video image, as a P-frame video image, to the network side.

Figure 10:
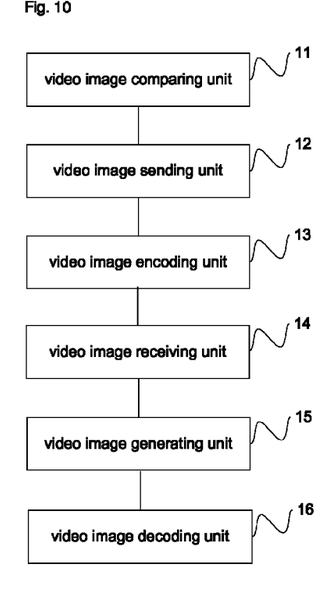
FIG. 10 is a schematic view of the structure of a video image sending device provided by the embodiments of the disclosure.

With reference to the FIG. 10, the device also comprises:

a video image encoding unit 13, which may be included in or independent from the video image comparing unit 11, being used for encoding the first video image and the macro blocks and sending the encoded video image to the network side;

a video image receiving unit 14, configured to receive from a network side, a first video image of an I-frame video image and macro blocks in a second video image of the I-frame video image which are different from those in the first video image; and receive a motion displacement of a current frame relative to the first or second video image of its previous frame, as a P-frame video image;

a video image generating unit 15, configured to generate the second video image according to the first video image and the macro blocks, specifically, generate the second video image by splicing macro blocks in the first video image which are identical to those in the second video image with the macro blocks in the second video image which are different from those in the first video image; and perform motion prediction and compensation for the first and second video images of the previous frame according to a set of motion vectors, to generate the first and second video images of the current frame;

a video image decoding unit 16, configured to decode the first video image and the macro blocks.

Figure 11:
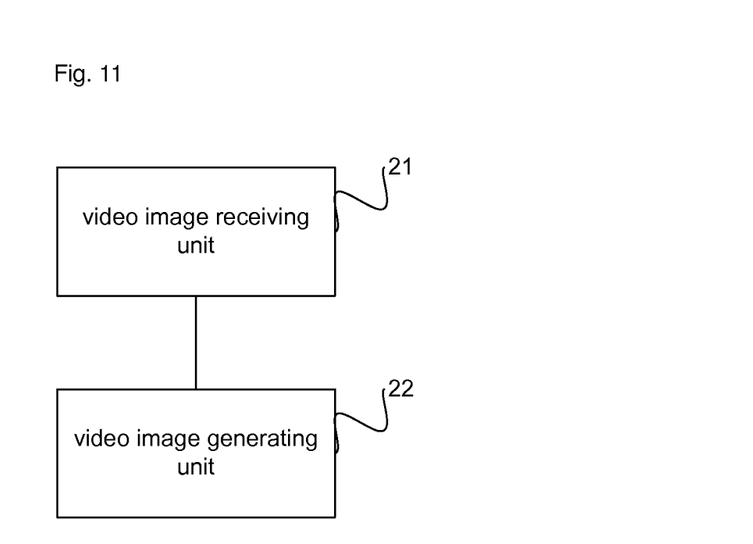
FIG. 11 is a schematic view of the structure of a video image receiving device provided by the embodiments of the disclosure.

With reference to FIG. 11, a video image receiving device provided by the embodiments of the disclosure comprises:

a video image receiving unit 21, configured to receive the macro blocks in the I-frames of video images from the network side and in the second video image which are different from those in the first image; and receiving the motion displacement presenting the P-frames of video images relative to the first and second video images in the previous video image.

a video image generating unit 22, configured to generate the second video image according to the first video image and the macro blocks, specifically, generating the second video image by splicing macro blocks in the first video image which are identical to those in the second video image with the macro blocks in the second video image which are different from those in the first video image; and performing motion prediction and compensation for the first and second video images of the previous frame according to a set of motion vectors, to generate the first and second video images of the current frame.

Figure 12:
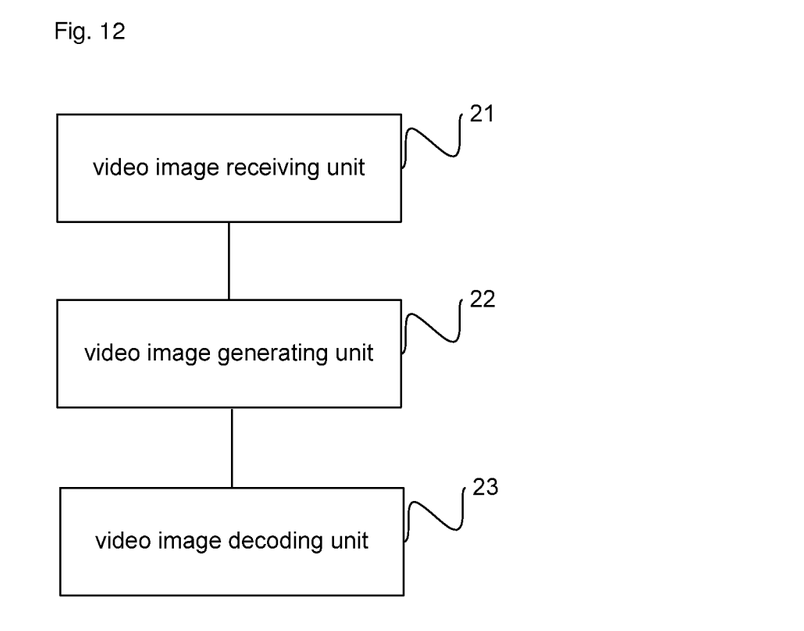
FIG. 12 is a schematic view of the structure of a video image receiving device provided by the embodiments of the disclosure.

With reference to the FIG. 12, the video image sending device also comprises:

a video image decoding unit 23, configured to decode the first video image and the macro blocks.

Figure 13:
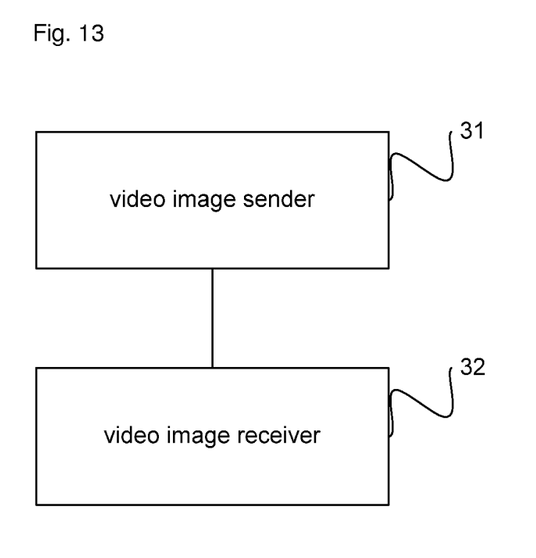
FIG. 13 is a schematic view of the structure of a video image sending system provided by the embodiments of the disclosure.

With reference to FIG. 13, a video image sending system provided by the embodiments of the disclosure comprises: a video sender 33 and a video receiver 34;

a video image sender 31, configured to compare an acquired first video image with an acquired second video image in order to find out macro blocks in the second video image which are different from those in the first video image; and sending the first video image and the macro blocks, as an I-frame video image, to a network side;

a video image receiver 32, configured to receive, from the video sender, a first video image of an I-frame video image and macro blocks in a second video image of the I-frame video image which are different from those in the first video image; generating the second video image according to the first video image and the macro blocks.

The 3D video sending device provided by the embodiments of the disclosure may be adapted to send a 2D video. Specifically, one video acquisition unit is shut down, and the video image comparing unit 11 takes no process on the received 2D video image and sends the 2D video image to the encoder for encoding at the same time during the sending of the 2D video; the video image generating unit 13 of the receiver taking no processing on the received 2D image and playing it directly.

The method and the device provided by the embodiments of the disclosure, with the existing H.263 protocol, can be compatible with 2D and 3D video sending, which enables users to send to each other according to the features of the modules.

It should be noted that, it is necessary to add 2D or/and 3D video play capacity into the H.245, which is the communication control protocol in the H.324 protocol stack, to have a handshaking agreement on the number of the macro blocks, so as to avoid communication failure. When all the mobile terminals support the 3D videophone with dual cameras, the 3D videophone is initiated only provided that a H.245 handshaking is successful. When the handshaking fails for one side does not support the function, the video part still encodes and decodes as the original H.263 protocol requires.

In conclusion, the embodiments of the disclosure adds a comparing unit for left and right views before or in an existing image encoder, and a generating unit for left and right views after an existing decoder or in an existing video encoder. The comparing unit for left and right views and the generating unit for left and right views are used for sending one complete view and a view different from the complete view in the other view while sending I-frame images, without the need of sending a complete image for each of the two views. When the P-frame is sent, it needs only to send motion vectors of a view in one frame to the video receiver. That is to say, the data amount consumed for sending the P-frame of the 3D video and that for the 2D video are completely identical. The data amount consumed for sending the I-frame of the 3D video is slightly more than that for the 2D video. With the bandwidth required by the existing H.263 communication protocol, on the basis of ensuring the sending of 3D images, the bandwidth is saved to the greatest extent and the 3D video is sent effectively and with high quality.

The skilled in the art should understand that, the embodiments of the disclosure can be provided as a method, system or computer programme product. Thus, the disclosure can in the form of complete hardware embodiment, complete software embodiment or the embodiment with the combination of software and hardware aspects. Moreover, the disclosure may be in form of a computer programme product which is implemented on one or more computer-usable memory medium (comprising but not limited to disk memory and optical memory, etc.) comprising computer-usable programme codes.

The disclosure is described according to the flow charts and/or block diagrams of the method, device (system) and computer programme product of the embodiments of the disclosure. It should be understood that each process and/or block in the flow charts and/or block diagrams, and a combination of processes and blocks in the flow charts and/or block diagrams can be implemented using computer programme instructions. These computer programme instructions can be provided to general purpose computer, special purpose computer, embedded processor and processor of other programmable data processing equipments to generate a machine, so as to generate a device which implements functions designated in one or more processes of a flow chart and/or in one or more blocks of a block diagram by a computer or a processor of other programmable data processing equipment.

These computer programme instructions also can be stored in a computer-readable memory which is able to guide the computer or other programmable data processing equipments to operate in a specific manner, which makes the instructions stored in the computer-readable memory generate a manufacture comprising the instruction device, which implements the functions designated in one or more processes of the flow chart and/or in one or more blocks of the block diagram.

These computer programme instructions also can be loaded into a computer or other programmable data processing equipments, which makes a series of operating steps are executed on the computer or the other programmable equipments in order to generate the processing implemented by the computer, such that the instructions which are executed on the computer or the other programmable equipments are provided for implementing the steps of the functions that are designated in one or more processes of the flow chart and/or in one or more blocks of the block diagram.

Obviously, modifications and variations to the disclosure by the skilled in the art are not beyond the spirit and the scope of the disclosure. In this way, if these modifications and variations to the disclosure are not beyond the scope of the claims and their equivalent technology, the disclosure is intended to comprise these modifications and variations.

INDUSTRIAL APPLICABILITY

The disclosure consists in comparing an acquired first video image with an acquired second video image in order to find out macro blocks in the second video image which are different from those in the first video image; sending the first video image and the macro blocks, as an I-frame video image, to the network side; receiving, from a network side, the first video image of an I-frame video image and the macro blocks in the second video image of the I-frame video image which are different from those in the first video image; generating the second video image according to the first video image and the macro blocks, which implements the aim of sending a 3D video reliably and effectively with a bandwidth required by the existing H.263.

The invention claimed is:

1. A video image sending method, which is adapted to send 3 D video images between video players, wherein the method comprises:

comparing an acquired first video image with an acquired second video image in order to find out macro blocks in the second video image which are different from those in the first video image;

sending a single I-frame video image consisted of the first video image and the macro blocks, for both the first video image and the second video image, to a network side; and sending a single P-frame video image consisted of a single set of motion vectors indicating a motion displacement of a current frame of the first or second video image relative to a previous frame of the first or second video image, for both the first video image and the second video image, to the network side, wherein the first video image is one of a left view and a right view of a 3D video image and the second video image is another of the left view and the right view of the 3D video image.

2. The method according to claim 1, further comprising: after finding out the macro blocks and before sending the macro blocks, encoding the first video image and the macro blocks, and sending the encoded video image to the network side.

3. A video image receiving method, comprising:

receiving, from a terminal, a single I-frame video image consisted of a first video image and macro blocks in a second video image which are different from those in the first video image; and generating the second video image according to the first video image and the macro blocks; and receiving a single P-frame video image consisted of a single set of motion vectors indicating a motion displacement of a current frame of the first or second video image relative to a previous frame of the first or second video image, for both the first video image and the second video image;

performing motion prediction and compensation for the first and second video images of the previous frame according to the single set of motion vectors, to generate the first and second video images of the current frame, wherein the first video image is one of a left view and a right view of a 3D video image and the second video image is another of the left view and the right view of the 3D video image.

4. The method according to claim 3, wherein the generating the second video image according to the first video image and the macro blocks comprises:

generating the second video image by splicing macro blocks in the first video image which are identical to those in the second video image with the macro blocks in the second video image which are different from those in the first video image.

5. The method according to claim 3, further comprising: after receiving the first video image and the macro blocks in the second video image which are different from those in the first video image and before generating the second video image, decoding the first video image and the macro blocks in the second video image which are different from those in the first video image.

6. A device, comprising:

a processor; and a memory storing program instructions, when executed by the processor, cause the processor to:

compare an acquired first video image with an acquired second video image in order to find out macro blocks in the second video image which are different from those in the first video image;

send a single I-frame video image consisted of the first video image and the macro blocks, for both the first video image and the second video image, to a network side; and send a single P-frame video image consisted of a single set of motion vectors indicating a motion displacement of a current frame of the first or second video image relative to a previous frame of the first or second video image, for both the first video image and the second video image, to the network side, wherein the first video image is one of a left view and a right view of a 3D video image and the second video image is another of the left view and the right view of the 3D video image.

7. The device according to claim 6, wherein the program instructions, when executed by the processor, further cause the processor to:

encode the first video image and the macro blocks, and send the encoded video image to the network side.

8. The device according to claim 6, wherein the program instructions, when executed by the processor, further cause the processor to:

receive, from a network side, the first video image of an I-frame video image and macro blocks in the second video image of the I-frame video image which are different from those in the first video image;

generate the second video image according to the first video image and the macro blocks.

9. The device according to claim 8, wherein the program instructions, when executed by the processor, further cause the processor to:

generate the second video image by splicing macro blocks in the first video image which are identical to those in the second video image with the macro blocks in the second video image which are different from those in the first video image.

10. The device according to claim 6, wherein the program instructions, when executed by the processor, further cause the processor to:

decode the first video image and the macro blocks.

11. A device, wherein the device comprises:

a processor; and a memory storing program instructions, when executed by the processor, cause the processor to:

receive, from a network side, a single I-frame video image consisted of a first video image and macro blocks in a second video image which are different from those in the first video image;

generate the second video image according to the first video image and the macro blocks;

receive a single P-frame video image consisted of a single set of motion vectors indicating a motion displacement of a current frame of the first or second video image relative to a previous frame of the first or second video image, for both the first video image and the second video image; and perform motion prediction and compensation for the first and second video images of the previous frame according to the single set of motion vectors, to generate the first and second video images of the current frame, wherein the first video image is one of a left view and a right view of a 3D video image and the second video image is another of the left view and the right view of the 3D video image.

12. The device according to claim 11, wherein the program instructions, when executed by the processor, further cause the processor to:
generate the second video image by splicing the macro blocks in the first video image which are identical to those in the second video image with the macro blocks in the second video image which are different from those in the first video image.

13. The device according to claim 11, wherein the program instructions, when executed by the processor, further cause the processor to:
decode the first video image and the macro blocks.

14. A video image sending system, comprising:
a video image sender and a video image receiver;
the video image sender is configured to compare an acquired first video image with an acquired second video image in order to find out macro blocks in the second video image which are different from those in the first video image; send a single I-frame video image consisted of the first video image and the macro blocks, for both the first video image and the second video image, to a network side; and send a single P-frame video image consisted of a single set of motion vectors indicating a motion displacement of a current frame of the first or second video image relative to a previous frame of the first or second video image, for both the first video image and the second video image, to the network side; and
the video image receiver is configured to receive, from the video sender, a single I-frame video image consisted of the first video image and macro blocks in the second video image which are different from those in the first video image; generate the second video image according to the first video image and the macro blocks; receive a single P-frame video image consisted of a single set of motion vectors indicating a motion displacement of a current frame of the first or second video image relative to a previous frame of the first or second video image, for both the first video image and the second video image; and perform motion prediction and compensation for the first and second video images of the previous frame according to the single set of motion vectors, to generate the first and second video images of the current frame,
wherein the first video image is one of a left view and a right view of a 3D video image and the second video image is another of the left view and the right view of the 3D video image.

* * * * *